US008261803B2

(12) United States Patent
Espe

(10) Patent No.: US 8,261,803 B2
(45) Date of Patent: Sep. 11, 2012

(54) PLATE PRESS

(75) Inventor: Rolf Espe, Bochum (DE)

(73) Assignee: HUECK Rheinische GmbH, Viersen (DE)

( * ) Notice: Subject to any disclaimer, the term of this patent is extended or adjusted under 35 U.S.C. 154(b) by 413 days.

(21) Appl. No.: 12/592,459

(22) Filed: Nov. 25, 2009

(65) Prior Publication Data

US 2010/0200172 A1 Aug. 12, 2010

(30) Foreign Application Priority Data

Nov. 25, 2008 (EP) .................................... 08105863

(51) Int. Cl.
*B32B 37/00* (2006.01)

(52) U.S. Cl. ................................ 156/583.3; 156/583.1

(58) Field of Classification Search .................. 156/228, 156/580, 581, 583.1, 583.3, 583.4, 583.5
See application file for complete search history.

(56) References Cited

U.S. PATENT DOCUMENTS 5,352,321 A * 10/1994 Held ............................ 156/498
6,481,482 B1 11/2002 Shimotomai
2005/0251977 A1* 11/2005 Lipponen et al. ............... 28/100

FOREIGN PATENT DOCUMENTS

| | | | |
|---|---|---|---|
| DE | 20 26 528 | A1 | 1/1971 |
| DE | 39 35 562 | A1 | 5/1991 |
| DE | 41 16 324 | A1 | 11/1992 |
| DE | 199 37 694 | A1 | 2/2001 |
| DE | 19937694 | | 2/2001 |
| DE | 103 16 774 | A1 | 11/2004 |
| DE | 10 2005 020 486 | A1 | 5/2006 |
| EP | 0 151 416 | A | 8/1985 |
| EP | 0 151 416 | A2 | 8/1985 |
| JP | 07 080871 | A | 3/1995 |

* cited by examiner

*Primary Examiner* — James Sells
(74) *Attorney, Agent, or Firm* — Von Rohrscheidt Patents

(57) ABSTRACT

A plate press (1), in particular a one-level or multilevel cycle press, including at least one heating plate (2), at least one press plate (5) and at least one press cushion, disposed between the press plate (5) and the heating plate (2), which press cushion comprises a cushion layer (4) which is liquid at least at the operating temperature of the plate press (1), which cushion layer is defined on one side by a fluid tight membrane (3), wherein the press plate is disposed on a side facing the press blank and the membrane (3) includes a flexible polymeric material. The membrane (3) is connected to the press plate (5).

13 Claims, 1 Drawing Sheet

PLATE PRESS

RELATED APPLICATIONS

This application claims priority from and incorporates by reference European patent application serial No. 08 105 863.8, filed on Nov. 25, 2008.

FIELD OF THE INVENTION

The invention relates to a plate press, in particular a one-level or multilevel cycle press with at least one heating plate, at least one press plate and at least one press cushion disposed between the press plate and the heating plate, which press cushion comprises a cushion layer, which is liquid at least at the operating temperature of the plate press and defined on one side by a fluid tight membrane, wherein the press plate is disposed on a side facing a material to be pressed and the membrane comprises a flexible polymeric material.

Such plate presses are used in particular for coating wood material plates with amino plastic resins in the form of phenolic resins, carbamide resins, melamine resins or melamine-carbamide mix resins. The materials to be pressed or the so-called blanks are e.g. HDF plates (High Density Fiber boards or plates), which are coated with melamine resins for use as flooring material (so-called “laminate”), wherein decorative surfaces with various configurations can be implemented. In order to achieve a high surface quality for such coating methods, an even pressure distribution over the entire plate press is essential, which plate press can comprise an operating surface of up to 20 $m^2$.

The functionality of the press cushions disposed between the heating plate and the press plate is of importance in this context, since due to manufacturing tolerances and possible subsequent warping of the press and thickness tolerances of the material to be pressed, an even pressure distribution over the blank can otherwise not be achieved. Therefore press cushions have to have sufficient elasticity, including resiliency, in order to be able to compensate for the thickness tolerances during the pressing process. Furthermore, they must have good recovery capabilities after the pressure is relieved, since the largest possible number of press cycles shall be achievable without exchanging the press cushions. The heat resistance and heat conductivity of the press cushions is another relevant property.

The recited amino plastic resins are duroplastic resins, in which the linking is achieved through poly-condensation such as where water vapor and superfluous formaldehyde are released in vapor form during the pressing process. The resulting steam bubbles diffuse into the material to be coated, e.g., the HDF-plate during the pressing process which occurs at a pressure of approximately 150 $N/cm^2$ to approximately 600 $N/cm^2$ and a temperature of 140° to 220° C. A different pressure distribution over the surface of the press can cause diffusion problems in this context, which cause surface faults in the finished product.

PRIOR ART

While press cushions were mostly comprised of plural layers of craft paper initially, various textile press cushion types are typical today. Due to a textile structure and an ensuing not perfectly homogeneous surface structure, differences in the effective pressure over the entire surface of the plate press, imparted upon the material to be pressed, cannot be avoided in practical applications.

Besides plate presses with textile- or also matte shaped press cushions, also other press configurations are already known, in which the problem of uneven pressure distribution shall be solved with press cushions comprising a liquid cushion layer.

Thus, a plate press is disclosed in DE 19 37 694 A1, in which a membrane in the form of a metallic plate is disposed below the press plate, which metallic plate is welded to the heating plate at its circumferential rim. A liquid cushion layer is disposed in a closed cavity between the metallic membrane plate and the heat plate. Said cushion layer is comprised of a lead-zinc alloy, which is characterized by good heat conductivity. The material of the pressure cushion is hardened when the press is cold. In order to achieve a form locked connection of the metallic membrane plate and the heat plate, while still allowing for a predetermined movement clearance of the membrane plate relative to the heat plate, T-shaped anchor heads are provided at the bottom side of the membrane plate, which engage corresponding anchor grooves in the upper side of the heat plate.

It is a disadvantage of such press configurations that the fabrication of heat plates with said undercut grooves is expensive and the membrane plate with its anchor heads has a complicated configuration. The exchange process is made more difficult through the form locked connection between said components as well.

Furthermore, DE 10 2005 020 486 A1 describes a cycle press, in which a liquid cushion layer is also provided between the press plate and the heat plate. In one of the embodiments of a plate press shown in DE 10 2005 020 486 A1, the liquid cushion layer is directly adjacent to the backside of the pressure plate on one side. On the other side, the liquid cushion layer is directly connected to the heating plate. Movable gaskets inserted into grooves in the heat plate are circumferentially disposed at the rim of the heat plate, whereas the press plate is mounted to overhanging rims, where mounting elements are disposed, which interact with mounting angles disposed at the face of the heat plate.

One disadvantage of the described plate press is the fact that a press plate exchange can only be performed after the liquid cushion layer has been removed from the cavity between the press plate and the heat plate more or less completely. This is performed by means of a special vacuum chamber, which is connected through an emptying channel to the pressure cushion chamber. The emptying process before removing the pressure plate and the filling process through a separate filling channel from a pressure chamber, which is required again after mounting a new pressure plate, each require time, which increases the idle time of the press. Furthermore, the pressure cushion cavity can never be emptied completely, so that certain residual quantities of the material of the liquid pressure cushion inevitably continue to adhere to the pressure plate to be removed, even after the emptying process.

It is known from another embodiment disclosed in DE 10 2005 020 486 A1 to form the pressure cushion chamber by means of an enclosure which is closed on all sides. Thus, the pressure plate is in direct contact with the enclosure on the backside facing away from the material to be pressed. On the other side of the pressure cushion, the envelope contacts the heating plate. On this side, the envelope is also connected in the area of a recess with a channel disposed at the heating plate, through which channel the pressure cushion can be filled and emptied from the outside. Having to fabricate a closed pressure tight pressure cushion made of metallic material is a disadvantage of this configuration.

A plate press of this type is known from EP 0 151 416 A2, in which a fluid tight membrane is connected to a heating plate, wherein the heating plate is thus advantageously provided with an indentation for forming a chamber for the fluid. This way, it is possible to dispose the inlet and outlet for the fluid in the heating plate, which is advantageous with respect to running the conduits. However, replacing the press cushion with the liquid cushion layer is complex, since the fluid has to be let out of the chamber initially, before the membrane can be removed.

BRIEF SUMMARY OF THE INVENTION

It is an object of the invention to provide a plate press, whose press cushion has a liquid cushion layer and can be replaced easily and quickly.

DETAILED DESCRIPTION

Based on a plate press of the described type, a plate press whose press cushion has a liquid cushion layer and can be replaced easily and quickly may be achieved by providing a membrane connected to the press plate.

This aspect of the invention thus omits using metallic membranes for sealing liquid cushion layers exclusively used so far, and is rather based on the approach that flexible polymeric materials are acceptable with respect to forming pressure and temperature, like metallic materials, but can be produced and handled more cost effectively. Another advantage of the flexible polymeric material is that the membrane closely adapts to the heating plate or to the pressure plate, and thus avoids insulating air gaps, which cannot be excluded from much stiffer metallic membranes. The heat transfer from the heating plate through the press cushion and subsequently through the press plate to the material to be pressed can therefore reach an excellent level, also with the membrane according to the invention including a flexible polymeric material.

The advantage of connecting the membrane to the press plate is that the press plate and the membrane form a unit, which facilitates a fast exchange of the press plate including the press cushion. Thus, the space between the press plate and the press cushion can be permanently sealed, so that the press cushion with the liquid cushion layer is replaced when an exchange is performed, or there is a sealable connection to the cavity, which facilitates removing the material forming the liquid cushion layer before removing the press cushion. In the latter case, influencing the pressure in the cushion layer through the connection is also possible during the press process. Through the connection of press plate and press cushion into a functional unit, the heating plate itself can remain unchanged relative to the known press types, so that a switchover from textile press cushions to liquid cushions is possible in a simple manner.

According to an embodiment of the plate press according to the invention, the liquid cushion layer is defined by the press plate on a side opposite to the membrane. An advantageous improvement of the press plate-press cushion unit is comprised in that the membrane and the press plate are circumferentially connected fluid tight with one another, in particular glued together or pressed together, in edge strips respectively protruding beyond a circumference of the heating plate. Condensation linked silicon glue can be preferably used as glue, which is capable of connection the membrane comprised of silicon elastomer with the steel material of the press plate in a durable and temperature resistant manner.

In order to obtain a sufficiently large connecting force over the circumference between membrane and press plate, circumferential clamping bars can be provided at the edge strips of the press plate, which clamp the edge strips of the membrane fluid tight between themselves and the press plate. Thus, furthermore, connection elements disposed circumferentially distributed along the edge strips, which are provided in particular in the form of screws, bolts, rivets or clamps, can respectively impart a clamping force upon the rim connection formed by the membrane, the pressure plate and the glue or sealing compound possibly disposed there between.

In order to prevent a lateral migration of the press cushion under the press pressure, the clamping bars can substantially close a gap portion between the heating plate and the press plate completely, when this gap portion occurs during press operation, and the clamping bars can thus support the faces of the membrane circumferentially in lateral direction.

In order to absorb the loads associated with press operation, the membrane may be comprised of a foil material with a thickness between 0.1 and 10 mm, or more advantageous between 1 mm and 3 mm. In order to increase its strength, the membrane can be provided with a reinforcement insert, in particular a cloth or also alternatively a textile area measured material made of metallic or polymeric threads, wherein the reinforcement insert should be completely embedded into the foil material, in order to accomplish a surface of the membrane which is as smooth as possible. A smooth surface with little roughness is important in order to obtain a large contact surface with the press plate or the heating plate, which facilitates heat transfer. The membrane can also be produced, so that polymeric material is applied to the reinforcement insert, wherein the insert can thus be embedded more or less completely.

In order to increase the heat transition through the press cushion, the foil material of the membrane can be filled with heat conducting and organic additive materials, such as with metal powder and/or silica powder. Such materials increasing heat conductivity can be e.g. aluminum oxide, boron nitride or silica powder. The portion of the additives must not exceed a certain measure, e.g. approximately 40%, so that the elasticity and the flexibility of the membrane are maintained.

In view of the operating temperatures of the plate presses, the material of the liquid cushion layer may be made of long chain- and/or cyclic hydrocarbons, in particular hydraulic oil, to which the additives increasing heat conductivity can be added, or they can be made of a metal or a metal alloy, which is liquid at the operating temperature of the plate press, in particular an alloy comprising lead and/or tin and/or bismuth.

In order to be able to change the pressure and/or the temperature within the press cushion during press operation by varying the space filled with the liquid cushion layer, a channel for feeding and removing the material of the liquid cushion layer can be provided, wherein the channel permeates the membrane and/or the press plate and can be closed and opened alternatively.

Eventually, a plate press, whose press cushion has a liquid cushion layer and can be replaced easily and quickly according to the invention is also accomplished through a press plate-press cushion unit, which is comprised of a metallic press plate and a membrane comprised of a flexible polymeric material, wherein the membrane and the press plate are connected fluid tight with one another in respective edge strips, in particular glued together and/or clamped together and/or pressed together, and wherein the press plate and the membrane define an enclosed space between one another, which is filled or fillable with a material which forms a liquid cushion layer at an operating temperature of a plate press. As recited, such a press plate-press cushion unit can be used in prior art plate presses, when a change in operating principle from textile press cushions to liquid cushions shall be performed.

BRIEF DESCRIPTION OF THE DRAWINGS

The invention will be described in detail with reference to the following drawings, in which like reference numerals refer to like elements, wherein.

DETAILED DESCRIPTION

Figure 1:
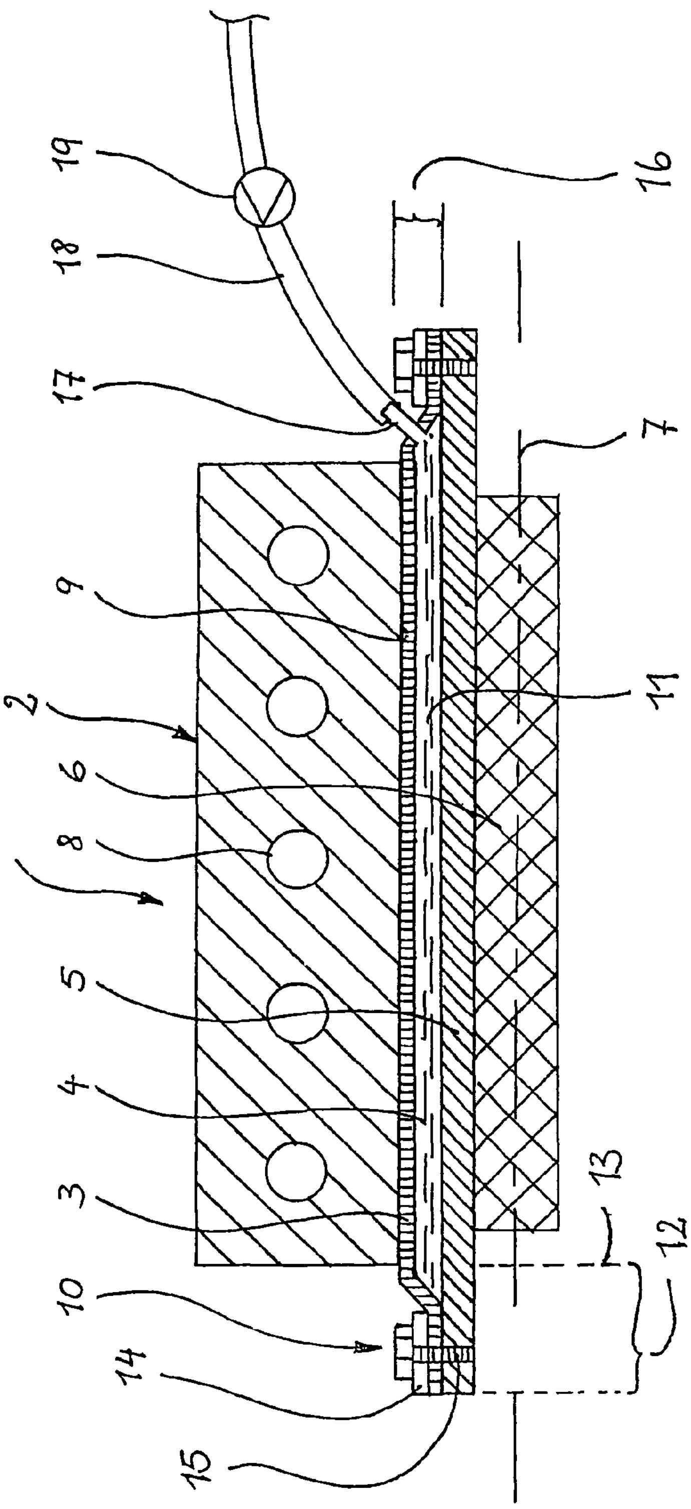
FIG. 1 shows a sectional view of an embodiment of a plate press with a press plate-press cushion unit.

A plate press 1 which is illustrated in FIG. 1 only in sections and schematically, and configured with the depicted components, and additionally in a known manner also with a plurality of press frames disposed in longitudinal direction of the press, which press frames comprise upper support columns and lower support columns and hydraulic cylinders, supported at the upper support columns and the lower support columns, additionally comprises a heating plate 2, a membrane 3, a cushion layer 4 made of liquid metal, a press plate 5 and a blank 6. For a one-level press, the configuration is symmetrical to a plane of symmetry 7, which is also the center plane of the blank 6. In multilevel presses, a lower heat plate, which is not shown, is followed in turn by a third press cushion, after which a second press blank is disposed. The assembly can continue in the same way over a plurality of levels. For reasons of simplicity, the subsequent description only relates to the assembly above the plane of symmetry 7.

The heating plate 2 configured as cast metal plate comprises a plurality of heating channels 8 passing through. In the plurality of heating channels 8, liquid heat transfer oil circulates that has been heated to the respective operating temperature or was heated to a certain degree above this operating temperature. A bottom side 9 of the heating plate 2 is in a heat conducting surface contact with the membrane 3 comprised of a silicon elastomer, which membrane 3 is flexible and has a certain elasticity. In the interior of the membrane 3, which includes a foil material, there is a reinforcement insert completely embedded in the silicon material, which reinforcement insert is provided in the form of a fabric configured from aramide fibers. As an alternative to the silicon elastomer, the membrane 3 can also be comprised of another elastomeric material such as a fluorine- or a silicon fluorine mix elastomer or a fluorine tetra polymer or any other suitable material.

The membrane 3 forms a press plate-press cushion unit 10 together with the press plate 5, which is made from steel and provided with a chromium layer which faces the press blank 6. The press plate-press cushion unit 10 is mounted to the heating plate 2 during press operation through connection means, which are not shown in detail, but can be disengaged from said heating plate easily without having to disassemble the press plate-press cushion unit 10. The press cushion itself is comprised of a liquid cushion layer 4 disposed above the press plate 5, which is comprised in the present configuration of a lead-tin alloy with a melting point of approximately 70° C. to 80° C. and comprised of the membrane 3 enclosing the cushion layer 4 above the press plate 5.

Figure 2:
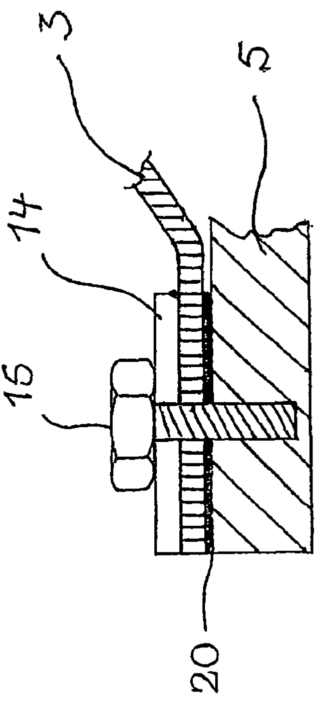
FIG. 2 shows an enlarged detail of the edge interconnection of the press plate according to FIG. 1.

As evident in particular from FIG. 2, sealing a cavity 11, in which the liquid cushion layer 4 is disposed, is performed by edge strips 12 circumferentially disposed about the heating plate 2, which protrude outward beyond a circumference 13 of the heating plate 2. Circumferential clamping bars 14 are also disposed above the membrane 3 in the edge strips 12, which clamping bars 14 are clamped together with the press plate 5 by means of bolts 15, and which clamp the membrane 3 disposed there between in this manner, thus closing the cavity 11 fluid tight. The clamping bars 14 can be configured, so that they substantially close a gap portion 16 extending perpendicular to the symmetry plane 7 between the press plate 5 and the bottom 9 of the heating plate 2, so that the membrane 3 in the portion of the edge portions 12 can be supported at the sufficiently stiff clamping bar 14 in the operating state of the press, so that an excessive expansion of the membrane 3 is prevented in the otherwise unprotected gap portions 16. The clamping bar 14 is configured in FIG. 1 as a flat rectangular cross section, which extends parallel to the press plate 5. In the portion of the clamping bars 14, a glue layer 20 is disposed between the membrane 3 and the press plate 5, which also provides better tightness besides increasing the strength of the edge interconnection.

A connection 17 for a conduit for filling the cavity 11 with the material of the liquid cushion layer 4 can be disposed in the gap portions 16 of the membrane 3. The pressure within the liquid cushion layer 4 can be adjusted by means of a hydraulic pump 19 during press operation or before press operation.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

REFERENCE NUMERALS AND DESIGNATIONS

1 plate press
2 heating plate
3 membrane
4 cushion layer
5 press plate
6 press blank
7 symmetry plane
8 heating channel
9 bottom side
10 press plate-press cushion unit
11 cavity
12 edge strip
13 circumference
14 clamping bar
15 bolt
16 gap portion
17 connection
18 conduit
19 hydraulic pump
20 glue layer

What is claimed is:

1. A plate press comprising:

at least one heating plate;

at least one press plate;

at least one press cushion disposed between the at least one press plate and the at least one heating plate, each press cushion including a cushion layer which is liquid at least at an operating temperature of the plate press, which cushion layer is defined on one side by a fluid tight membrane, wherein the at least one press plate is disposed on a side facing a press blank and the membrane including a flexible polymeric material, and wherein the membrane is connected to the at least one press plate.

2. The plate press according to claim 1, wherein the cushion layer is defined by the at least one press plate on a side opposite to the membrane.

3. The plate press according to claim 1, wherein the membrane and at least one press plate are circumferentially connected and fluid tight to one another, due to being glued together or pressed together, in edge strips, which protrude respectively beyond a circumference of the heating plate.

4. The plate press according to claim 3, comprising circumferential clamping bars disposed at the edge strips of the at least one press plate, which clamping bars clamp the edge strips of the membrane between themselves and the at least one press plate fluid tight, wherein connection elements disposed circumferentially spaced along the edge strips respectively impart a clamping force onto a rim interconnection.

5. The plate press according to claim 4, wherein the connection elements are screws, bolts, rivets or clamps.

6. The plate press according to claim 4, wherein the clamping bars close a circumferential gap portion substantially completely between the heating plate and the at least one press plate, as soon as the gap portion is provided during plate press operation, thus circumferentially supporting the faces of the membrane in lateral direction.

7. The plate press according to claim 1, wherein the membrane is made of a foil material with a thickness between 0.1 mm and 10 mm, and includes a reinforcement insert, wherein the reinforcement insert is completely embedded into the foil material.

8. The plate press according to claim 7, wherein the thickness is between 1 mm and 3 mm, and the reinforcement insert includes a fabric made of metallic and/or polymeric threads.

9. The plate press according to claim 7, wherein the foil material is provided with heat conducting inorganic additives in particular metal powder and/or silica powder.

10. The plate press according to claim 1, wherein the liquid cushion layer is comprised of long chain and/or cyclical hydrocarbons, which is supplemented by additives increasing heat conductivity or the liquid cushion layer is comprised of a metal or metal alloy, which is liquid at the operating temperature of the plate press.

11. The plate press according to claim 10, wherein the liquid cushion layer is hydraulic oil, and wherein the metal or metal alloy is an alloy including at least one of lead, tin and bismuth.

12. The plate press according to claim 1, comprising a channel passing through the membrane and/or the press plate, which channel can be dosed and opened for feeding or removing the material of the liquid cushion layer.

13. The plate press according to claim 2, wherein the membrane and at least one press plate are circumferentially connected and fluid tight to one another, due to being glued together or pressed together, in edge strips, which protrude respectively beyond a circumference of the heating plate.

* * * * *